Feb. 13, 1940.   M. M. IDZAL   2,190,516
STEREOSCOPIC PICTURE DEVICE
Filed Dec. 31, 1935   2 Sheets-Sheet 1
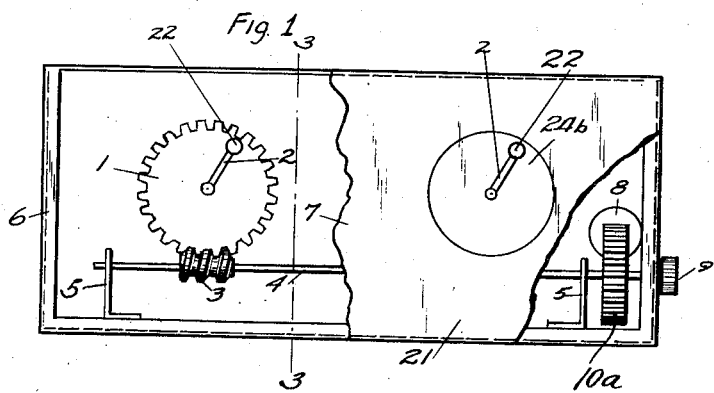
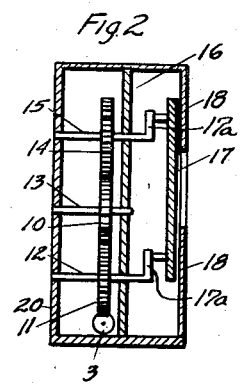
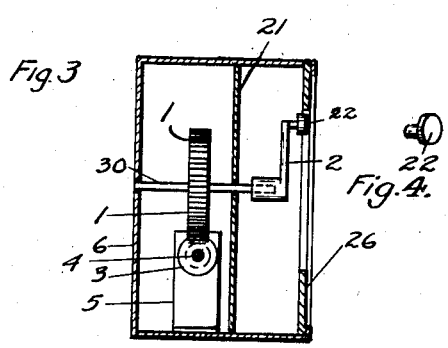
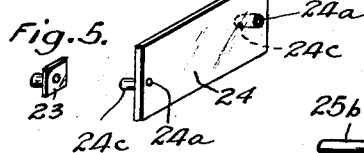
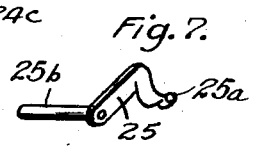
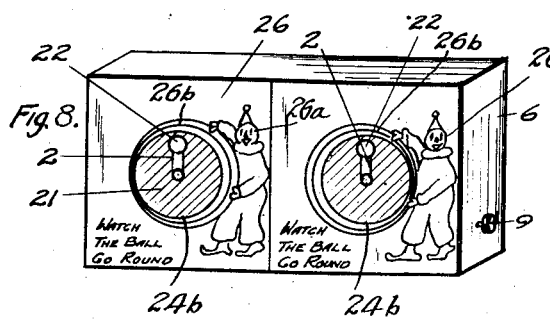
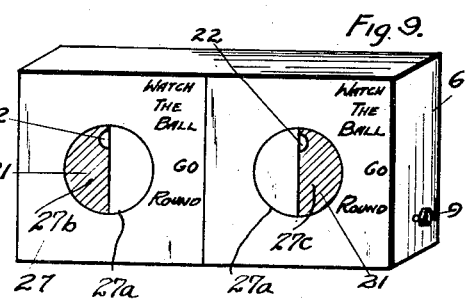
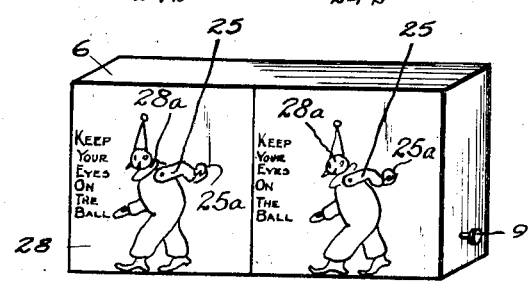
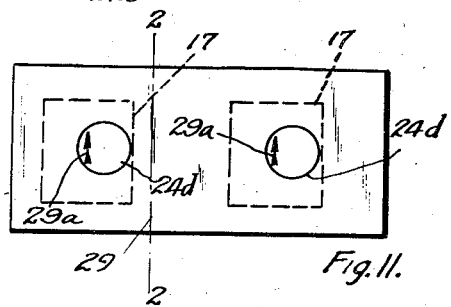
INVENTOR
Milton M. Idzal Feb. 13, 1940. M. M. IDZAL 2,190,516
STEREOSCOPIC PICTURE DEVICE
Filed Dec. 31, 1935 2 Sheets—Sheet 2

INVENTOR
Milton M. Idzal

Patented Feb. 13, 1940

2,190,516

UNITED STATES PATENT OFFICE 2,190,516

STEREOSCOPIC PICTURE DEVICE

Milton M. Idzal, Sioux City, Iowa

Application December 31, 1935, Serial No. 56,875

1 Claim. (Cl. 128—76.5)

This invention relates to a stereoscopic picture device that will provide a stereoscopic moving section of a picture against a stationary stereoscopic background, and at the same time also provides a stereoscopic eye-piece to view said picture; the stereoscopic lenses of the said eye-piece being moveable in relation to each other in such a manner that the variable prismatic effect thus produced will cause the right and left views of the stereoscopic picture to apparently move closer together or farther apart.

It will be seen that when the right and left views of the stereoscopic picture apparently move closer together, the eyes of the beholder must converge in order to properly see the pictures as one and, when the right and left views apparently separate to a greater distance, the eyes of the beholder must diverge the required amount.

The mechanical stereoscopic pictures are interchangeable to suit various fineness or dullness of perception. The purpose of the pictures being to hold the observer's attention by providing all of the various elements of visual stimulation (light, form, color, depth perception, and motion) and at the same time cause the eyes to converge or diverge an unusual amount in order to stimulate the functional muscles at the will and control of the operator.

It will be noted that what is known as "macular" stimulation is provided by the small moving section of the pictures, while "peripheral" stimulation is provided by the stationary part of picture sweeping over the periphery of the retina as the eye follows the moving section.

To attain these and other ends I provide a stereoscopic picture embodying cut-out portions placed in corresponding positions of the right and left views thereof, a means of placing these cut-out sections in motion against the stationary stereoscopic background in such a manner as to impart the appearance of animation to said sections. I also provide a variable prismatic-effect stereoscope through which to view the pictures and a conventional type table stand upon which the picture and the stereoscope are mounted.

With the above and other objects in view, the invention consists in the construction, combination and arrangements of parts hereinafter fully described and claimed and illustrated in the accompanying drawings, wherein:

Figure 1 is a front view of one construction of my arrangement with a portion thereof taken in section.

Figure 2 is a sectional end view of an optional construction shown in Figure 11 whereby the moving sections of the picture may be held in a constant vertical position while in motion.

Figure 3 is a sectional end view of the construction shown in Figure 11.

Figure 4 is a detail of one of the attachable picture sections for attachment as a moving target.

Figure 5 is another attachable member of a similar type.

Figure 6 is a further attachable member adapted to extend across two crank arms laterally of the device.

Figure 7 is a further attachable member.

Figure 8 is a front view of a stereoscopic picture incorporating my construction.

Figure 9 is a front view of a modified form of stereoscopic picture incorporating the structure wherein the moving part of the picture may be made visible alternately to the right and then to the left eye of the observer.

Figure 10 is a front view of a further type of structure in which the member shown in Figure 7 is employed.

Figure 11 is a front view of the construction shown in section in Figure 2.

Figure 12:
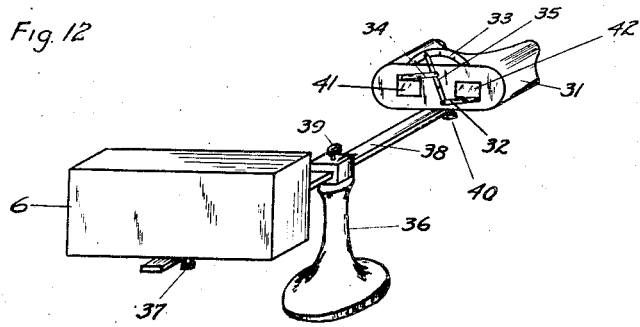
Figure 12 is a view showing the device mounted on a table stand.
Figure 13:
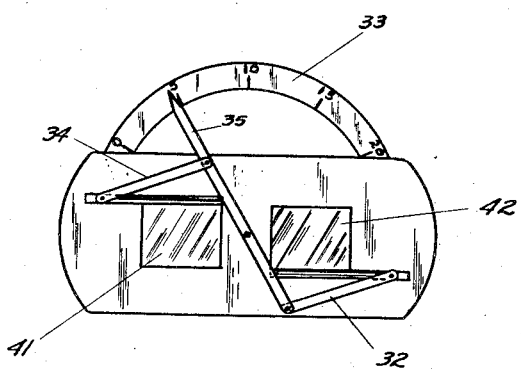
Figure 13 is a view of the stereoscope taken from the front showing the lever arrangement whereby the lenses can be drawn together or farther apart.
Figure 14:
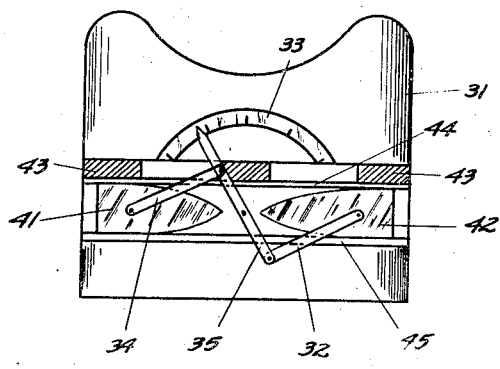
Figure 14 is a top view of an optical construction of the stereoscope showing the lever arrangement mounted upon the top of the stereoscope.

I have used the character 1 in Figures 1 and 3 to designate a gear upon which a crank 2 is mounted. A worm gear 3 is attached to the shaft 4 which is suitably journalled within the brackets 5. The character 6 represents the casing or housing member for the unit. The character 8 represents the connection to a motor for driving the unit which can mesh with a suitable further gear 10a. The character 9 represents a thumb piece for initiating or starting the action if such is desired.

The character 22 represents a small circular cut out picture section attached to the arm 2. The gear 1 is attached to the shaft 30 which is suitably journalled within the casing and which terminates in the arm 2. Figure 5 shows the small square unit 23 which can be attached to the crank arm and Figure 6 shows the rectangular section which can be used to extend laterally across the unit and wherein the small dots 24a will appear in each opening such as 24b. The members 24 are connected to the crank arms by means of the extending pins 24c. The character 25 represents an arm of a figure as shown in Figure 10 holding a ball such as 25a and the arm 25 is attached to a suitable pin 25b which passes centrally through the gear 1 instead of the shaft 30 and can be journalled in the same manner.

In a further modification, as shown in Figure 2 the character 10 represents a free running pinion gear mounted on a shaft 13. The character 12 indicates a lower crank shaft and the character 15 an upper crank shaft which are attached to the other gears 11 and 14. The character 20 represents the rear face of the housing and 18 the front face. The character 17 indicates a picture section which is attached to the lower and upper cranks 17a of the modification shown in Figure 11 and which is a square section as shown by the dotted figures thereof.

Figure 8 shows the unit assembled having the further picture portion 26 upon which is imprinted the picture of a clown 26a and the circles 26b. As shown, the target 22 revolves within the opening 24b for the necessary purpose.

Figure 9 illustrates a modification wherein there are two circles on the face 27, which imprinted circles are indicated by the character 27a. The circles 27a, however, are cut into semicircles leaving the open semi-circular formations 27b and 27c. In this form of structure, the moving target is permitted to be visible alternately to the right eye and then to the left eye. This is for the purpose of encouraging vision in the poorer or amblyopic eye which faculty is stimulated by the appearance of one object and then another.

In this form of structure, the target 22 can be employed. As explained, Figure 10 illustrates a form of the device wherein the clown 28a is imprinted on the face 28 and wherein the pin 25b (see Figure 7) extends through the gear 1 medially thereon thus producing rotation of the arm. Figure 11 shows a front face 29 with the two openings 24d and behind which are attached the square members 17 which are attached as shown in Figure 2. The synchronous rotation of the arms 17a through the gear arrangement will maintain the arrow or vertical figure 29a in vertical position throughout the operation thereof.

The character 31 represents a stereoscope having the pivoted indicator handle 35. 32 and 34 are pivoted arms attached to the lens frames. 41 and 42 are stereoscope lenses. The table stand is represented by the character 36 and the characters 37, 39 and 40 are thumb screws on the arms 38. The character 43 is an eye hole member of the stereoscope and 44 and 45 are track members holding the lenses 41 and 42 in line. The character 33 represents an indicator dial.

From the foregoing description with special reference being had to Figures 1 to 11 inclusive, it will be seen that I have provided a device which has many advantages. This device will present all the elements of vision to the eye of the observer in controllable quantities at the will of the operator and will stimulate the visual acuteness by using objects of different sizes as moving targets such as 22, 23, 24 or 25 in conjunction with various stereoscope backgrounds visible therewith and the smaller the test object the greater acuity required.

Depth perception is stimulated by the fact that the aforementioned backgrounds embody a depth stereogram namely, the circles printed thereon as shown in Figure 8. This gives the appearance to the observer of looking down through a basket or similar object and the movable target will appear to be at the bottom or at the far end of the basket. Inasmuch as depth perception is gained largely through the marginal part of the retina, the depth becomes more quickly apparent due to the fact that the central fields or fixation points of both eyes are fixed upon the small moving target in the center.

The fact that the stereoscope backgrounds are interchangeable, keeps the observer's attention refreshed. The fusion ability is very similar to the depth perception. When the depth of the "basket" is perceived it is evident that fusion has been obtained. As a result, all of these factors in combination provide the maximum ocular response.

As shown in Figure 1, the stereoscopic effect is obtained through two openings 24b which is shown with the picture imprinted thereon in Figure 8. The various other combinations are readily perceived through the above description with the attachments being provided for the necessary purposes.

It should be understood that the drawings are merely illustrative and do not give exact proportions or do not give exact methods of holding members in conjunction with one another. Furthermore, the drawings are illustrative of a preferred construction, it being my expectation that various changes and modifications may be made without departing from the spirit and scope of my invention.

I am aware that prior to this invention, I have received a Patent Number 2,001,024 on a stereoscopic picture embodying laterally spaced apertures therein through which movable sections of said picture may be viewed. I therefore, do not now claim such a combination broadly, but I claim:

A stereoscopic picture device comprising a stereoscopic picture having a left hand and a right hand semicircular opening, a pair of targets, one for each opening, eccentrically rotatable behind said openings and having their centers of rotation upon the center of the straight portions of said semicircular openings, said semicircular openings adapted to provide visibility of said target alternately to the left and right eye of an observer.

MILTON M. IDZAL.